United States Patent

Lo

[11] Patent Number: 5,406,813
[45] Date of Patent: Apr. 18, 1995

[54] EXTENDABLE LOCK FOR STEERING WHEEL

[76] Inventor: Tsung-I Lo, 5th Fl., No. 76, Ai-Kuo E Rd., Taipei, Taiwan, Prov. of China

[21] Appl. No.: 181,207
[22] Filed: Jan. 13, 1994
[51] Int. Cl.⁶ .................................. G60R 25/02
[52] U.S. Cl. .............................. 70/209; 70/226
[58] Field of Search ............. 70/209, 226, 238, 211, 70/212, 225, 237

[56] References Cited

U.S. PATENT DOCUMENTS

| | | | |
|---|---|---|---|
| 1,145,265 | 7/1915 | Quirk, Jr. | 70/226 |
| 5,107,692 | 4/1992 | Chen | 70/226 X |
| 5,138,853 | 8/1992 | Chen | 70/209 |
| 5,211,041 | 5/1993 | Hsu | 70/226 X |

Primary Examiner—Lloyd A. Gall

[57] ABSTRACT

An extendable lock for a steering wheel including a locking tube with a channel therein. A locking housing is disposed at a suitable position on the locking tube. The locking tube includes a hook. A locking rod is received by the channel of the locking tube. A plurality of ratchet slots are disposed at suitable positions on the locking rod. A hook is provided on the locking rod. An actuating mechanism is placed within the locking housing for facilitating an easy pull-out of the locking rod when the actuating mechanism is at a retracted position.

3 Claims, 5 Drawing Sheets

EXTENDABLE LOCK FOR STEERING WHEEL

BACKGROUND OF THE INVENTION

This invention relates to an extendable lock, more particularly, to an extendable lock for a steering wheel. The locking rod of the extendable lock can be easily pulled out without the utilization of a key.

Referring to FIG. 1, the conventional lock for a steering wheel comprises a locking body, a steel bail 10, biased by a spring 11, and a stopping block 12. A lock housing 13 is disposed on the upper portion of the lock body 1. A cylinder 14 is received and retained within the lock housing 13. A post 140 which has a cutout 141 at one side and a circular surface 142 at the other side is disposed on the under portion of the cylinder 14. A channel 15 is provided through the lock body 1. Handle tube 16 is attached to the rear end of the lock body 1 such that the channel 15 continues through the handle tube 16, A hook 160 is disposed at the lower portion of the handle tube 16. A locking rod 17 having a plurality of ratchet slots 171 on the rod body 17 is received by the channel 15 of the locking body 1. A second hook 170 is disposed at one end of the locking rod 17.

When the locking rod 17 is inserted into the channel 15, one of the ratchet slots 171 engages the circular portion 142 of the post 140, as shown in FIG. 2. Whether the locking rod 17 is moved in or out, the cylinder 14 is rotated by a key to release the ratchet slot 171 from the circular surface 142, allowing the locking rod 17 to be moved freely in or out. When the locking rod 17 is moved to the desired position, the cylinder 14 is rotated again to retain the ratchet slot 171 with the circular surface 142.

But, the conventional steering wheel lock has the following shortcomings:

1. It is not easy to use: Whether the locking rod 17 is moved in or out, the ratchet slot 171 must be first released from the blocking circular surface 142 by the rotation of the cylinder 14.
2. The anti-theft protection is poor: If a circular steel plate is inserted into the channel 15 of the lock body 1 to press the steel ball 10 out of the channel 15, the locking rod 17 can be easily moved. On the other hand, the post 140 can be forced to rotate to release the ratchet slot 171 from the engagement of the circular surface 142. Again, the locking rod 17 can be easily pulled out.
3. Since the locking rod 17 is rotatable within the channel 15, it is difficult to reach a suitable locking position of the locking rod 17.

SUMMARY OF THE INVENTION

It is the object of this invention to provide an extendable lock for a steering wheel such that the locking rod can be easily pulled out. The lock can easily be retained in the steering wheel.

In order to achieve the object set forth, the extendable lock for a steering wheel comprises a locking tube with a channel therein. A handle is disposed at the rear end. A locking housing is disposed at a suitable position on the locking tube. The locking housing includes a continuation of the channel of the locking tube. The locking tube further includes a hook on a lower portion. A locking rod is to be received by the channel of the locking tube. A plurality of ratchet slots are disposed at suitable positions on the locking rod. A hook is provided on a first end of the locking rod. An actuating mechanism is placed within the locking housing. This actuating mechanism includes a positioning collar which has a pair of vertical slots in an inner wall. A retaining block is slidably disposed within the vertical slots. This retaining block further includes a guiding post at the upper portion. A seating block is provided at an upper end of the retaining block. An actuating sleeve has a pair of spiral slots on the wall for receiving the guiding post. A pair of holes are disposed at the upper portion of the actuating sleeve. A coil spring is received within the actuating sleeve and seated on the seating block of the retaining block. A cylinder is received by the locking housing. The cylinder has a connecting block at the lower end. A hole is provided at the connecting block for connecting the guiding sleeve through a connecting pin received therein.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of an extendable lock for a steering wheel. In the drawings.

DETAILED DESCRIPTION OF THE PREFERRED EMBODIMENT

Figure 1:
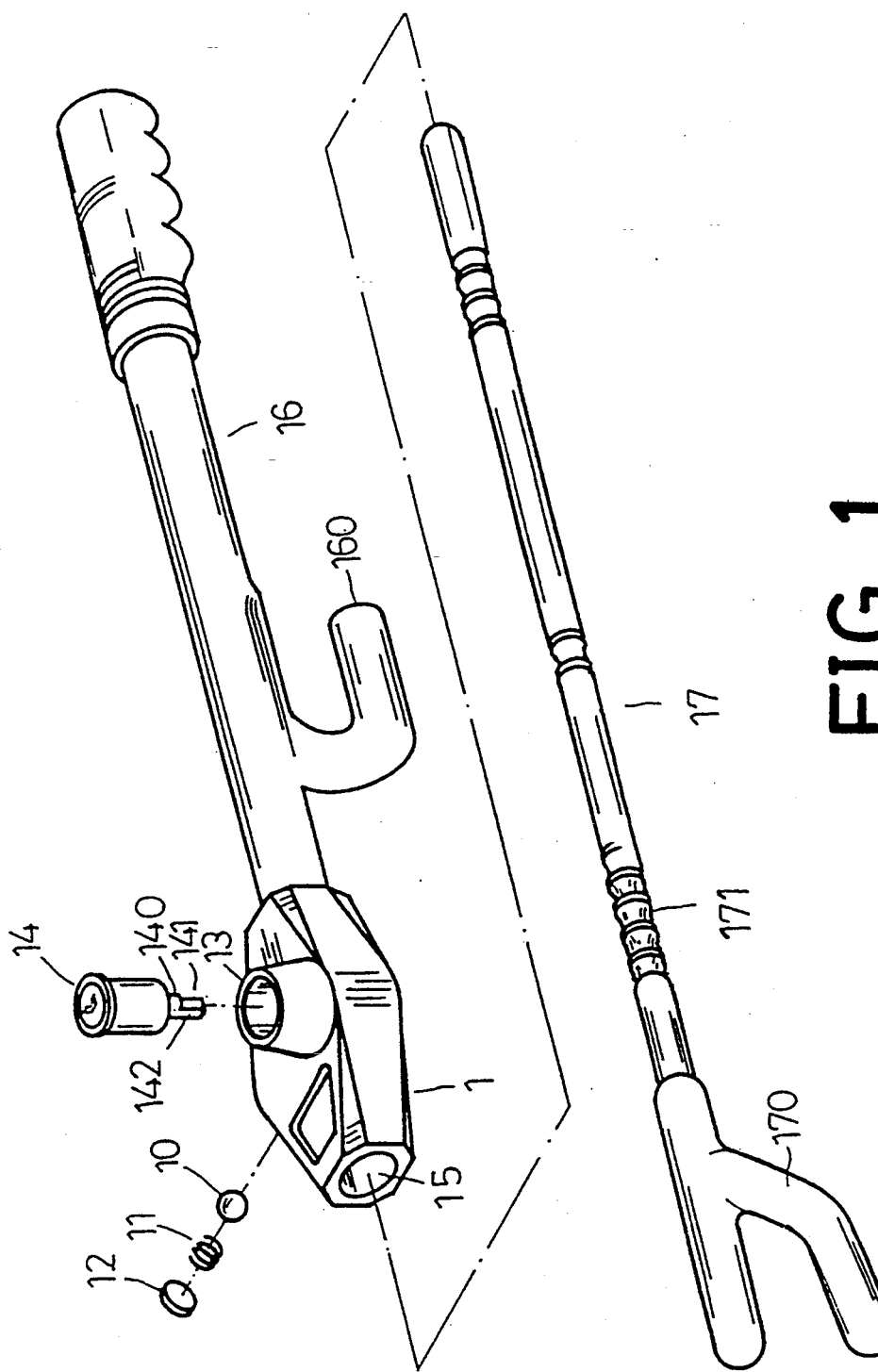
FIG. 1 is an exploded view of a conventional lock for a steering wheel.
Figure 2:
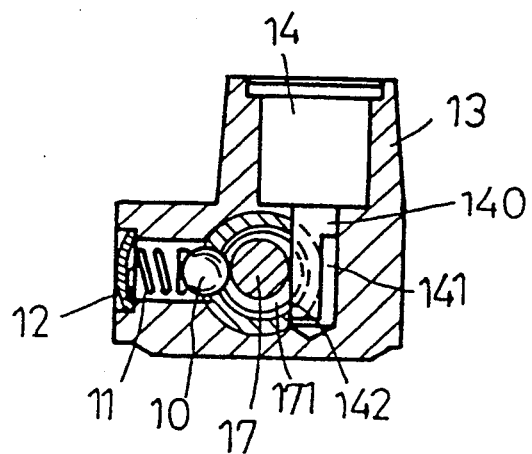
FIG. 2 is a cross sectional view of the conventional lock shown in FIG. 1.
Figure 3:
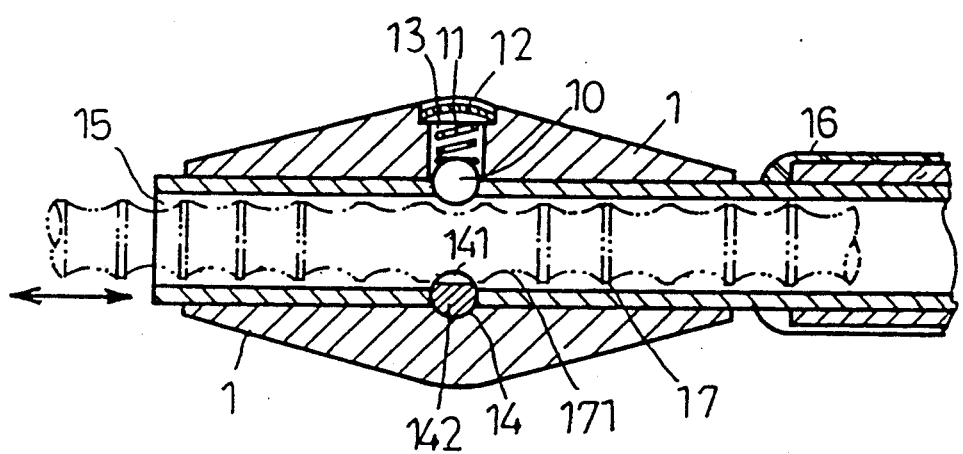
FIG. 3 is a cross sectional view of a conventional lock for a steering wheel.
Figure 4:
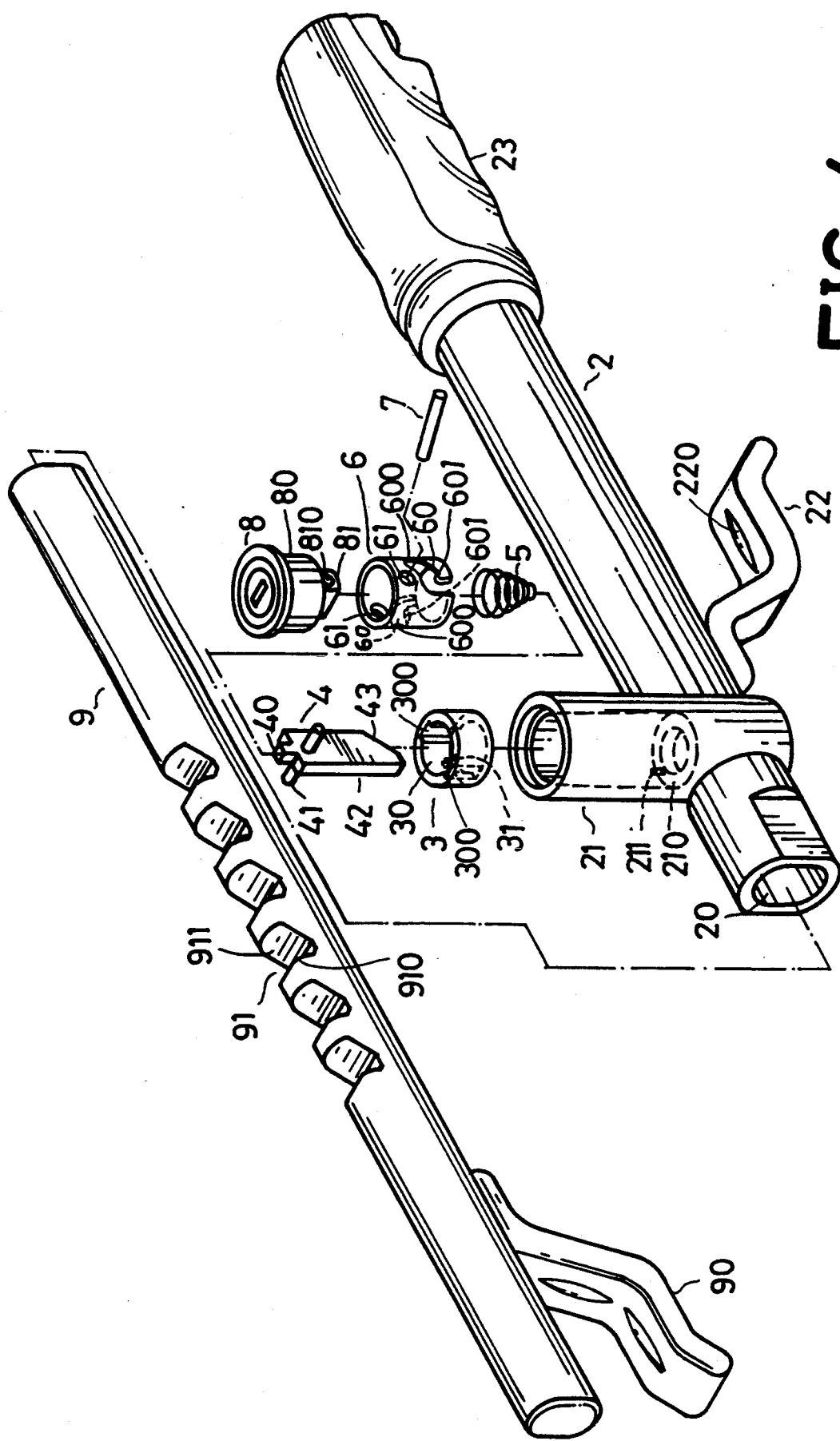
FIG. 4 is a perspective exploded view of an extendable lock for steering wheel.

Referring to FIG. 4, the extendable lock for a steering wheel comprises a locking tube 2 with a channel 20 therein. A handle 23 is disposed at a first end. The locking tube 2 further includes a hook 22 on a lower side thereof. A reinforced rib 220 is provided on the hook 22. A locking housing 21 is disposed at a suitable location on the locking tube 2. The locking housing 21 includes a continuation of the channel 20 of the locking tube 2. The locking housing 21 has a ring seat 210 at the bottom. A dowel pin 211 is disposed on the ring seat 210.

A locking rod 9 is received by the channel 20 of the locking tube 2. A plurality of ratchet slots 91 are disposed at suitable positions on the locking rod 9. The ratchet slots 91 have a vertical surface 910 and an inclined surface 911. A hook 90 is provided on a first end of the locking rod 9.

An actuating mechanism is placed within the locking housing 21. This actuating mechanism includes a positioning collar 3 which has a pair of opposing vertical slots 300 on its inner wall. A chamber 30 is defined in the center of the collar 3. A retaining block 4 is slidably disposed within the vertical slots 300. This retaining block 4 further includes a guiding post 41 at the upper portion. A seating block 40 is provided at the upper end of the retaining block 4. This retaining block 4 includes a vertical surface 42 and an inclined surface 43 at the lower end.

An actuating sleeve 6 has a pair of spiral slots 60 at the wall for receiving the guiding post 41 therein. The spiral slots further include a first positioning notch 600 and a second positioning notch 601. A pair of holes 61 are disposed at the upper portion of the actuating sleeve 6. A coil spring 5 is received within the actuating sleeve 6 and seated on the seating block 40 of the retaining block 4. This coil spring 5 is disposed between the retaining block 4 and the actuating sleeve 6.

A cylinder assembly 8 is received by the locking housing 21. The cylinder 8 has a cylinder body 80 and a connecting block 81. A hole 810 is provided at the connecting block 81 for connecting the guiding sleeve through a connecting pin received therein.

Figure 5:
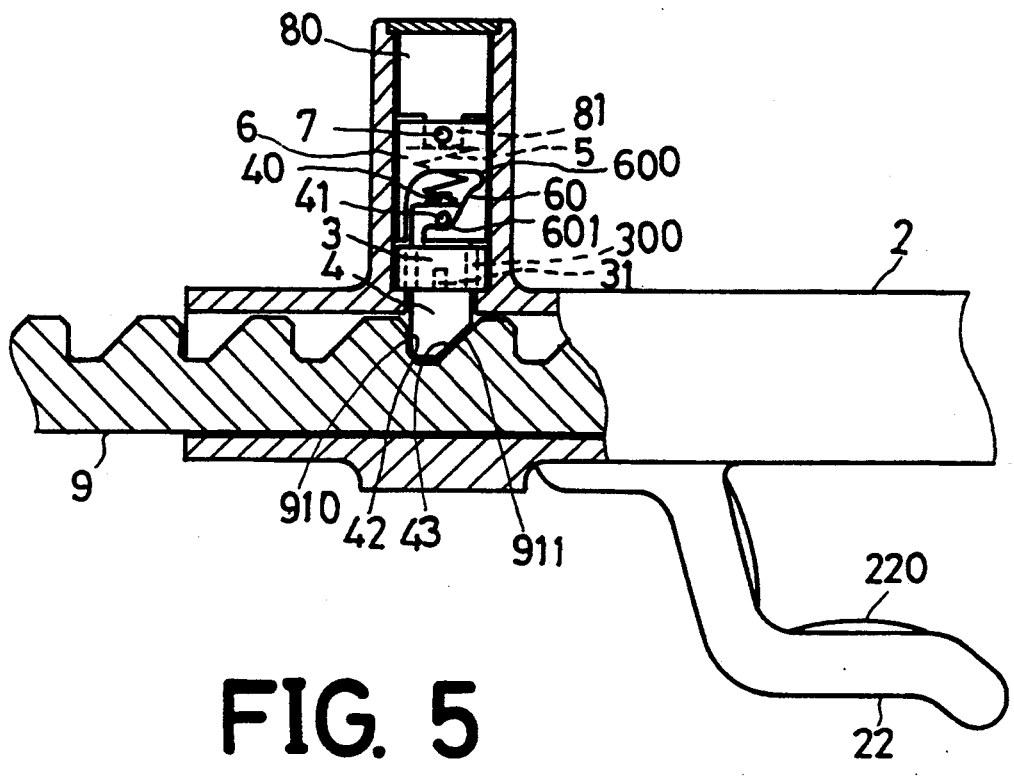
FIG. 5 is a cross sectional view of the extendable lock shown in FIG. 4.

Referring to FIG. 5, after those elements described above are assembled in order, the guiding post 41 is positioned in the second positioning notch 601. In this position, the retaining block 4 is at the fully extended position as biased by the coil spring 5. By this arrangement, the vertical surface 42 is in contact with the vertical surface 910 of the ratchet slot 9. The locking rod 9 is thereby blocked from moving inward, but is free to move outward. Since the channel 15 and the locking rod 9 have flattened oval cross sections, the locking rod 9 cannot rotate freely in the channel 15.

Figure 7:
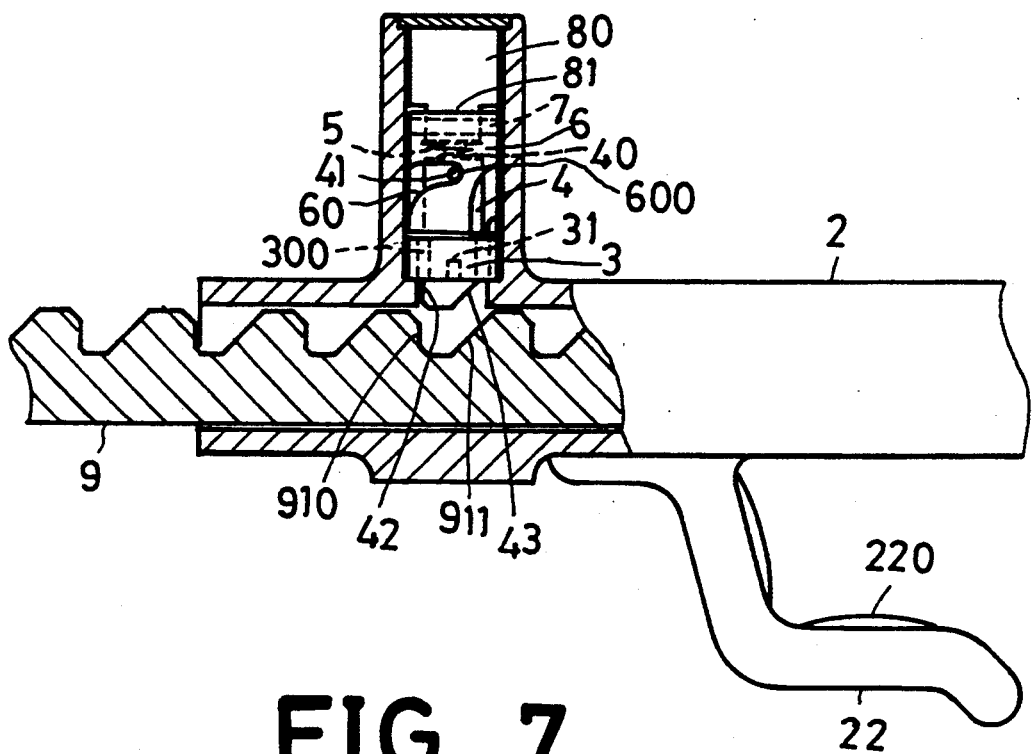
FIG. 7 is a cross sectional view showing the retaining block moved upward by the rotation of the cylinder.
Figure 6:
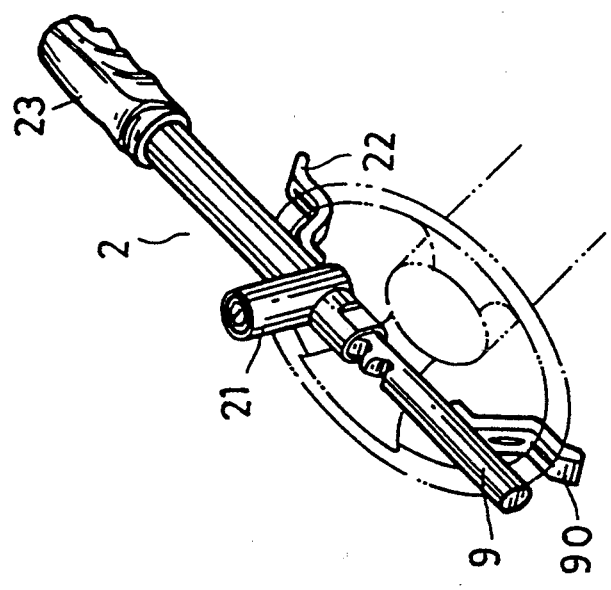
FIG. 6 is a view showing an extendable lock retained on a steering wheel.

If the locking rod 9 needs to be moved inward, the cylinder assembly 8 is rotated, and the retaining block 4 moves upward along the vertical slots 300 when the guiding post 41 is lifted along the spiral slots 60, and is finally positioned in the first positioning notch 600, as shown in FIG. 7. In this position, the retaining block is in a retracted position due to said guiding post 41 being retained in said first positioning notch 600. By this arrangement, the ratchet slot 91 is released from the retaining block 4 and the locking rod 9 is free to be pushed inward. The lock can then be released from the steering wheel.

Normally, the retaining block 4 is in the fully extended position such that said guiding post 41 is retained in the second positioning notch 601. That means that the locking rod 9 is free to be pulled outward, but is blocked from being pushed inward. In application, the hook 22 can be first retained on one side of the steering wheel, then the locking rod 9 can be extended such that the hook 90 is retained at the opposite side of the steering wheel. By this arrangement, the lock is retained on the steering wheel without using the key.

The extendable lock for a steering wheel made according to this invention can be seen to have the following advantages:
1. The locking rod can be easily pulled out to be installed on the steering wheel without using the key.
2. The extendable lock can provide excellent anti-theft protection.
3. The locking rod can be moved in and out easily without rotating within the channel.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. An extendable lock for a steering wheel comprising:
    a locking tube with a channel therein, a handle being disposed at a first end thereof, a locking housing being disposed at a suitable position on the locking tube such that said locking housing includes a continuation of said channel of said locking tube, said locking tube further including a hook on a lower side thereof;
    a locking rod being received by the channel of said locking tube, a plurality of ratchet slots being disposed on said locking rod, a hook being provided on a first end of said locking rod; and
    an actuating mechanism being placed within said locking housing, said actuating mechanism including
        a positioning collar having a pair of vertical slots on an inner wall thereof, said positioning collar being disposed at the bottom of said locking housing;
        an actuating sleeve disposed above a retaining block and having a pair of spiral slots in a wall thereof to receive a guiding post, with a pair of holes being disposed at an upper portion of the actuating sleeve;
        said retaining block being slidably disposed within said vertical slots, said retaining block further having a guiding post at an upper portion, a seating block being provided at an upper end of said retaining block, said guiding post being received by said spiral slots;
        a coil spring being received within the actuating sleeve and seated on the seating block of said retaining block; and
        a cylinder being received by said locking housing, said cylinder having a connecting block for connecting at a lower end, a hole being provided in the connecting block for connecting the actuating sleeve through a connecting pin received therein.

2. The extendable lock for a steering wheel as recited in claim 1 wherein:
    said spiral slots of said actuating sleeve are defined with a first positioning notch and a second positioning notch.

3. The extendable lock for a steering wheel as recited in claim 1 wherein:
    said channel of said locking tube has a flattened oval cross section.

* * * * *